United States Patent [19]

Krueger

[11] Patent Number: 4,785,519

[45] Date of Patent: Nov. 22, 1988

[54] STRUT SPRING COMPRESSOR

[75] Inventor: Harold Krueger, Barnsville, Minn.

[73] Assignee: Branick Industries, Inc., Fargo, N. Dak.

[21] Appl. No.: 34,278

[22] Filed: Apr. 2, 1987

[51] Int. Cl.⁴ .......................................... B23P 19/04
[52] U.S. Cl. .................................... 29/227; 254/10.5
[58] Field of Search ................. 29/227, 225, 215–218; 254/10.5

[56] References Cited

U.S. PATENT DOCUMENTS

| | | | |
|---|---|---|---|
| 1,469,076 | 9/1923 | Faber. | |
| 3,814,382 | 6/1974 | Castoe | 254/10.5 |
| 3,912,224 | 10/1975 | Castoe | 254/10.5 |
| 4,009,867 | 3/1977 | Diffenderfer | 254/10.5 |
| 4,036,473 | 7/1977 | Kloster | 254/10.5 |
| 4,105,188 | 8/1981 | Mendoza et al. | 254/10.5 |
| 4,295,634 | 10/1981 | Spainhour et al. | 254/10.5 |
| 4,395,020 | 7/1983 | Spainhour | 254/10.5 |
| 4,486,935 | 12/1984 | Kashiwagi | 29/227 |
| 4,494,289 | 1/1985 | Matsuura | 29/227 |
| 4,516,303 | 5/1985 | Kloster | 29/227 |
| 4,520,543 | 6/1985 | Ito | 29/227 |
| 4,558,500 | 12/1985 | Kloster | 29/227 |

OTHER PUBLICATIONS

Model 2770 MacPherson Strut Compressor.
New Generation MacPherson Strut Service Tools by Ken-Tool.
"The Strutter" Designed for MacPherson Strut Work.
T-490 MacPherson Strut Tool.
Strut Spring Compressor Tool Rebate Program published by Monroe Auto Equipment Company in 1984.
7100 MacPherson Strut Spring Compressor published by Lisle Corporation.
Operation Instructions published by Kloster Research & Development, Inc.
New from Moog T-40187 MacPherson Strut Coil Spring Compressor Tool published by Moog Automotive, Inc.

Primary Examiner—Frederick R. Schmidt
Assistant Examiner—Judy J. Hartman
Attorney, Agent, or Firm—Merchant, Gould, Smith, Edell, Welter & Schmidt

[57] ABSTRACT

An apparatus is disclosed for use in assembling and disassembling a strut assembly of the type having a shock absorber axially disposed within a coil spring. The apparatus includes a frame and attachment members for holding a first portion of the spring with the spring positioned in predetermined alignment within the frame. A compression head is mounted on the frame and movable toward and away from a compression direction. The compression head includes first and second compression elements for imparting a force on a second portion of the spring and urging the spring toward the compression direction. The compression head includes linkage for connecting the first and second compression elements with the elements being movable relative to one another and free to assume unaligned positions as the compression head urges the spring into compression.

10 Claims, 6 Drawing Sheets

STRUT SPRING COMPRESSOR

BACKGROUND OF THE INVENTION

I. Field of the Invention

This invention relates generally to accessory tools and more particularly to an apparatus for use in assembling and disassembling a strut assembly of the type having a shock absorber axially disposed within a coil spring.

II. Description of the Prior Art

Certain types of automotive suspension systems, such as the MacPherson type, comprise a suspension sub-assembly. The sub-assembly includes a shock absorber and a spring. A part of a piston of the shock absorber projects upwardly from the strut in a telescoping fashion. A coil spring is mounted in a compressed state around the piston between a lower spring seat integral with the head end of the absorber and an upper spring seat fastened to the upper end of the piston of the shock absorber. Such a suspension sub-assembly is assembled separately and then mounted as a unit in the vehicle body. Also, during maintenance of an automobile, it is not uncommon to assemble and disassemble such suspension sub-assemblies.

During the assembly of a MacPherson-type suspension sub-assembly, the upper spring seat is disconnected from the upper end of the shock absorber piston. The coil spring is placed onto the strut with the piston extending axially through the helical spring. The lower end of the spring is disposed abutting against the lower spring seat. The coil spring is then compressed by a suitable power tool to bring the upper end of the coil spring below the upper end of the piston of the shock absorber. So compressed, the piston upper end protrudes beyond the coil spring upper end. The upper spring seat is then fastened to a threaded part of the upper end of the shock absorber piston by a nut. The spring is thus retained between the upper and lower spring seats in a compressed state. To disassemble a MacPherson-type suspension sub-assembly, the foregoing process is reversed. Namely, the coils spring is compressed by the suitable power tool and then the upper spring seat is removed. The coil is then decompressed and may be removed from the strut.

Numerous apparatus have been developed to assist in the assembly and disassembly of a strut suspension system. An example of these may be found in U.S. Pat. Nos. 4,558,500; 4,520,543; 4,516,303 and 4,494,289, to name a few. In the design of such apparatus, it is desireable to have an apparatus which can accept a wide variety of different sized MacPherson strut assemblies and to be quickly adapted by an operator to accept a particular sized strut assembly for quick and efficient assembling and disassembling. It is also recognized to be important to insure that the apparatus can securely engage and retain a spring to be compressed and otherwise insure safety to an operator since the compressed springs are compressed under a large force which, if released without control, could injure an operator.

SUMMARY OF THE INVENTION

According to a preferred embodiment of the present invention, there is disclosed an apparatus for use in assembling and disassembling a strut assembly having a shock absorber axially disposed within a coil spring. The apparatus includes a frame and a first spring connection means for holding the strut assembly spring in predetermined alignment with the frame and for resisting movement of a first end of the spring in a predetemined compression direction. A compression head is mounted on the frame and movable toward and away from the compression direction. The compression head includes first and second contact elements for imparting a force on a second end of the spring and urging the spring to compress as the compression head is moved toward the compression direction. urging means is provided for urging the compression head to move toward the compression direction. The compression head includes connector means for connecting the first and second contact elements with the elements being movable relative to one another and free to assume unaligned positions as the compression head urges the spring into compression.

DESCRIPTION OF THE PREFERRED EMBODIMENT

Referring now to the Figures in which identical elements are numbered identically throughout, the present invention will now be described with reference to a preferred embodiment. The apparatus of the present invention is generally shown at 10. Apparatus 10 includes a frame 12 having a flat vertically disposed back plate 14 which may be mounted against a work place wall (not shown). The frame 12 includes spaced apart top and bottom plates 16,18 respectively, each of which are rigidly bolted to back plate 12 by a plurality of bolts 20. Extending between top plate 16 and bottom plate 18 are a pair of parallel spaced apart vertical bars 22 and 24.

Disposed at the bottom portion of the apparatus 10 is a connection means for holding a strut assembly 100 in predetermined alignment relative to the apparatus 10. The connection means includes three attachment members 26,28 and 30 for holding a lower portion of a helical strut spring 102. The attachment members 26,28 and 30 are each provided with upwardly cupped ends 36,38 and 39.

Figure 6:
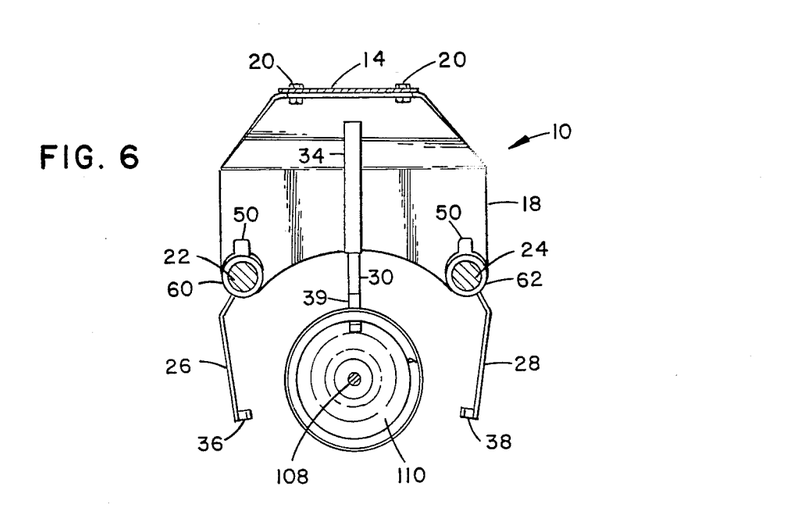
FIG. 6 is a view taken generally along lines VI—VI of FIG. 2 and showing lower spring supports in spaced apart positions.

Attachment member 30 is slidably received within a housing 34. Housing 34 is secured to lower plate 18 by a pair of mount supports 42. Mount supports 42 are positioned for member 30 to slide in a direction generally perpendicular to an axis of a strut assembly 100 which is aligned within apparatus 10 (as best shown in FIG. 6).

Attachment members 26 and 28 are mounted on bars 22,24, respectively, by mounting sleeves 44 and 45.

Figure 3:
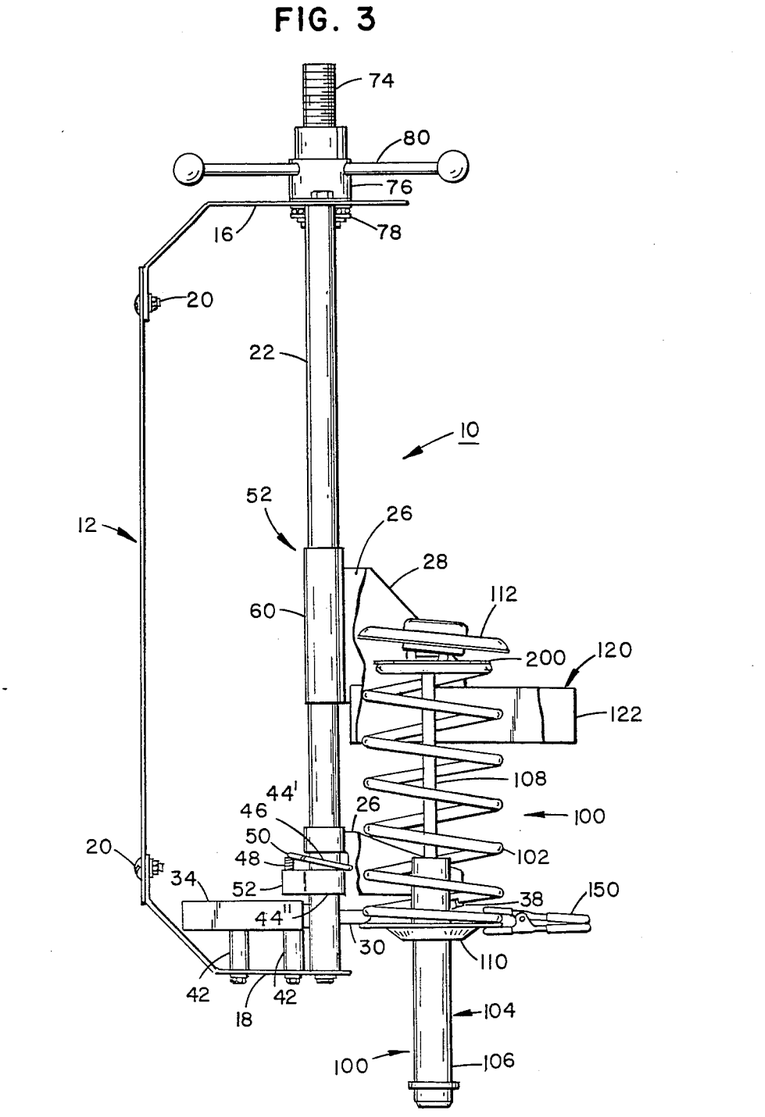
FIG. 3 is a side elevation view of the apparatus and strut assembly of FIG. 2.

Each of mounting sleeves 44 and 45 are identical and the description of sleeve 44 will suffice as a description of sleeve 45 and similar elements will be identically numbered. Best shown in FIG. 3, sleeve 44 is split into an upper portion 44' and a lower portion 44". The attachment member 26 is integrally connected to each of portions 44',44". Disposed between portions 44' and 44" is a ring 46 having an inside diameter slightly greater than a diameter of bar 22. A spring 48 is disposed between a tab 50 of ring 46 and a protruding grip 52 of lower portion 44". Upon urging of the tab 50 towards grip 52, the ring 46 is aligned with bar 22 and sleeve 44 may be freely moved along bar 22. Upon release of the tab 50 and grip 52, spring 48 urges the ring 46 out of alignment into the position shown in FIG. 3. With the ring out of alignment, the ring binds against bar 22 and resists further movement of sleeve 44 along bar 22. Namely, sleeves 44,45 are rotatable on bars 22,24. In addition to be movable in the direction of bars 22,24, the attachment members 26 and 28 are pivotable about an axis which is co-axial with bars 22,24.

As a result of the above-described structure, attachment member 30 may move in and out of its housing 34 toward and away from the center of a properly aligned spring strut assembly 100. Attachment members 26 and 28 may be moved up or down on bars 22,24 and may be pivoted toward and away from an aligned spring strut assembly 100.

The apparatus 10 includes a compression head 52 which is mounted on bars 22 and 24 to slide toward and away from the attachment members 26,28 and 30. For purposes of this application, movement of the compression head 52 toward the attachment members 26,28 and 30 will be referred to as movement of the compression head 52 in a compression direction. Movement of the compression head 52 away from the attachment members 26,28 and 30 will be referred to as movement of the compression head away from the compression direction.

The compression head 52 includes a first compression member 54 and a second compression member 56. First compression member 54 includes a hollow sleeve 60 and a generally axially extending vertical plate 58. Likewise, second compression member 56 includes a hollow sleeve 62 and a generally axially extending vertical plate 64. Hollow sleeve 60 is mounted to slide on bar 22. Similarly, hollow sleeve 62 is mounted to slide on bar 24.

A linkage 68 connects sleeve 60 with sleeve 62. Best illustrated in FIG. 5, linkage 68 includes a pair of parallel spaced apart plates 70,72. Rigidly disposed on opposing surfaces of sleeves 60,62 are opposing plate mounting blocks 74,76. Plates 70,72 are pivotally mounted to opposite sides of blocks 74,76 by bolts 80 passing through aligned openings of plates 70,72 and blocks 74,76. The bolts 80 act as pivot pins. The openings 170 of plates 70,72 are elongated slots (shown best in FIGS. 2 and 4). With sleeve 60 connected to sleeve 62 by means of the pivotable pin connections of linkage 68, sleeve 60 may move on bar 22 relative to the movement of sleeve 62 on bar 24.

Urging means is provided for urging the compression head 52 to move in the compression direction. In the preferred embodiment, the urging means is in the form of a threaded shaft 74 which is journaled through a threaded hub 76. Hub 76 is mounted by means of a bearing 78 to top plate 16. Accordingly, hub 76 is freely turnable by an operator engaging handles 80 and turning hub 76. Turning of handles 80 moves shaft 74 up or down depending on the direction of turning.

Threaded shaft 74 terminates at a force transmitting end 82. Shaft 74 is disposed to be parallel to and centrally disposed between support bars 22,24. Force transmitting end 82 is pivotably connected to the center of linkage 68 by a pivot pin 84.

First and second compression elements 86,88 are carried on compression members 54,56, respectively. Each of compression members 54,56 include hollow cylindrical hubs 90 and 92, respectively. The compression elements 86,88 are cylindrical steel bars and extend through hubs 90,92. Opposing ends of compression elements 86,88 have downwardly projecting hooks 94,96. Each of the compression elements 86,88 is axially slidable within hubs 90,92 and also pivotable about their cylindrical axes.

Figure 1:
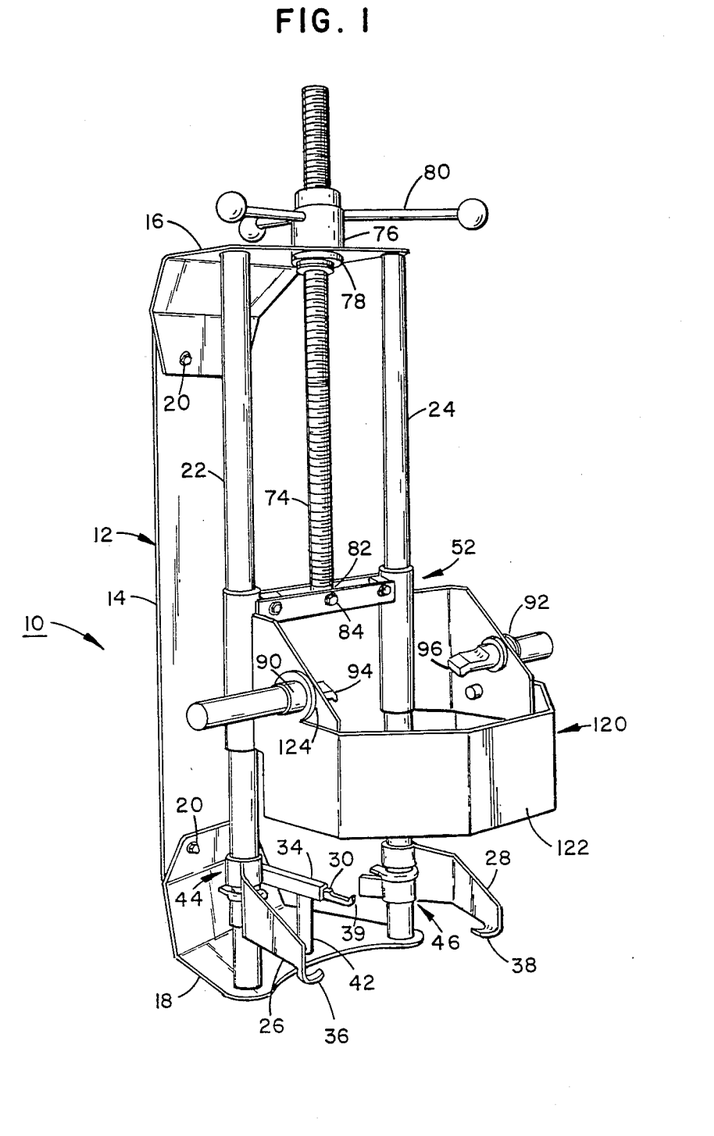
FIG. 1 is a perspective view of an apparatus of the present invention.
Figure 5:
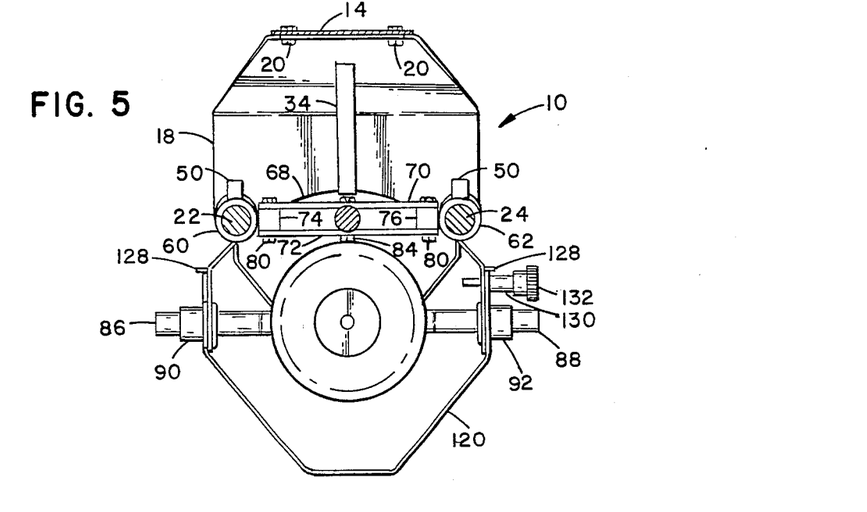
FIG. 5 is a view taken generally along lines V—V of FIG. 2.

A guard 120 is provided and includes a generally protruding steel plate member 122 having opposing and axially aligned loop portions 124,126. Loop portions 124,126 are disposed to be rotatably received on hubs 90,92, respectively. The protruding plate 122 depends from loops 124,126 such that the weight of the protruding plate 122 causes the guard 120 to naturally fall to its down position as shown in FIG. 1. Stops 128 extending from each of compression members 54,56 (as shown in FIG. 5) are abutted by the protruding plate 122 when it is in its down position.

Mounted on the side of the protruding plate 122 is a lock pin 130 having an engageable handle 132. Handle 132 may be drawn to the right in the view of FIG. 5 against the urging of a spring (not shown) to draw pin 130 out of aligned holes within compression member 56 and guard 120. With pin 130 so removed from compression member 56, guard 120 may be pivoted about hubs 90,92 to an up position (not shown) with the protruding plate 122 disposed above the compression head 54. It will be appreciated that spring actuated lock pins such as pin 130 are well known in the art and form no part of this invention per se.

Use of the apparatus 10 will now be described with reference to a strut assembly 100. Strut assembly 100 is a common MacPherson-type strut assembly and includes a spring 102 and a shock absorber 104. Shock absorber 104 has a head portion 106 and an extending piston 108. Mounted on head 106 is a lower spring seat 110. An upper spring seat 112 is connected to a free end of piston 108 by means of a nut (not shown). The strut assembly 100 is a commercially available item and is well known. The spring 102 is retained between lower plate 110 and upper plate 112 with the spring 102 held in compression.

From time to time, it is desireable to remove a spring 102 from a strut assembly 100. The present invention is ideally suited to this task.

Figure 2:
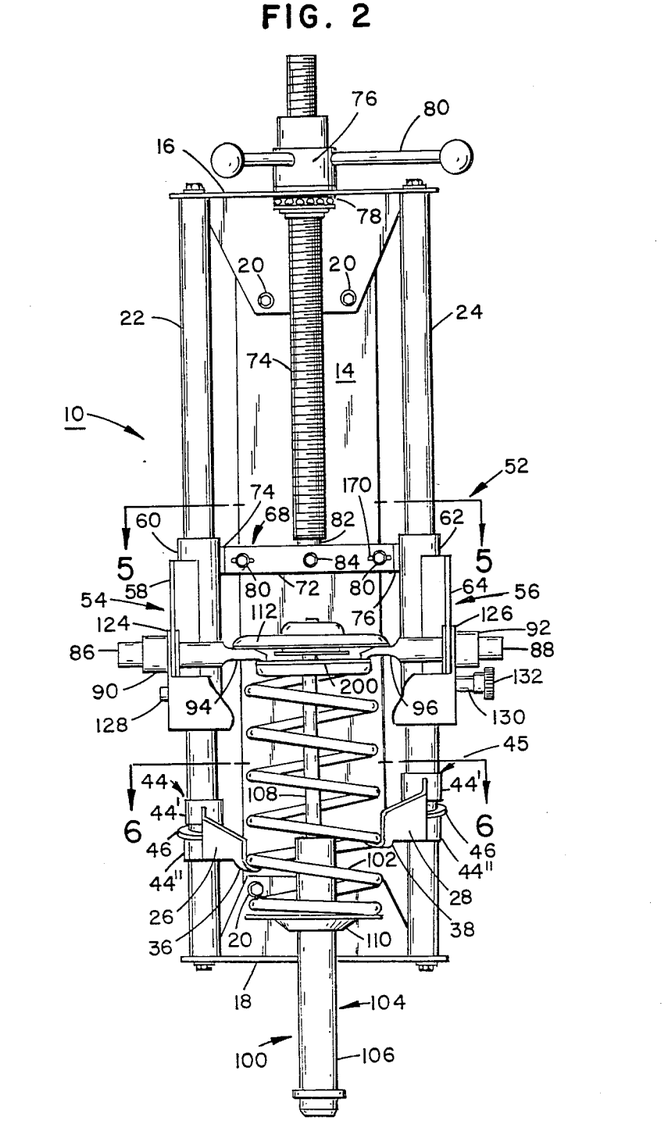
FIG. 2 is a front view taken in elevation of the apparatus of the present invention in use with a MacPherson-type strut assembly.

An operator engages handle 132 to unlock guard 120 and pivot guard 120 about hubs 90,92 to its up position. With guard 120 in its up position, a strut assembly may be aligned with the apparatus 10 (as shown in FIG. 2). So aligned, attachment members 26,30 and 28 may be adjusted to engage a lower portion of the spring 102. Attachment member 30 is moved axially toward the strut 100 with cup 39 received beneath a portion of the helical spring 102. Each of attachment member 26,28 are moved independently upwardly or downwardly on bars 22,24 and pivoted toward or away from the spring 102 until the cup ends 36,38 are snugly received beneath a portion of the helical spring 102 as best shown in FIG.

2. With the spring now resting on attachment members 26,30 and 28, the compression head 52 is moved downwardly by appropriate turning of handles 80. The compression head 52 is moved downwardly until the hook ends 94,96 of compression elements 86,88 are disposed to engage an upper portion of spring 102 or an intermediate plate 200 which is commonly connected to upper ends of springs in many MacPherson strut assemblies. The compression elements 86,88 may be moved axially within hubs 90,92 to insure proper positioning of ends 94,96. When the compression elements 86,88 are properly disposed against an upper portion of spring 102, an operator pivots the guard 120 to its down position. Stops 128 insure proper alignment of the guard 120. Pin 130, acting against an urging of its internally housed spring, locks the guard 120 in place.

Figure 4:
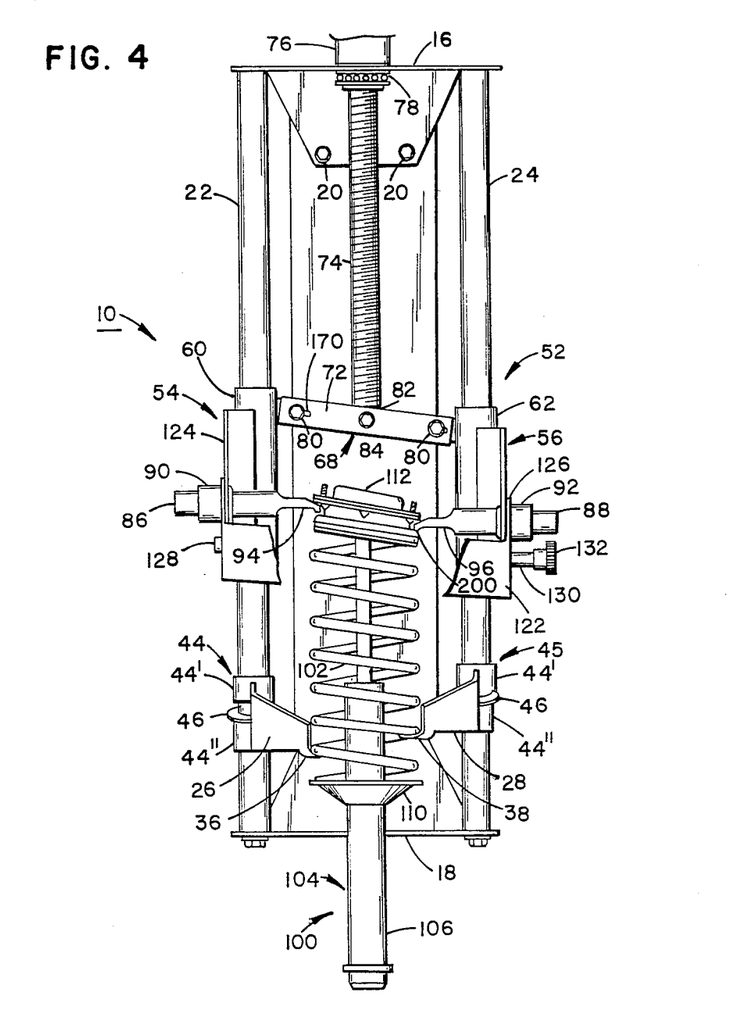
FIG. 4 is the view of FIG. 2 showing the apparatus in a compressed state.

With the guard 120 in place and the compression head 52 properly aligned, the operator turns handles 80 to urge the compression head 52 in the compression direction. As the compression head 52 is compressing spring 102, the resistance to urging at the upper portion of the spring is unequal on the opposite sides of the spring. The compression head automatically adjusts to this uneven opposition by reason of the linkage 68. As shown in FIG. 4, during the compression of spring 102, sleeves 60,62 move relative to one another with the compression elements 86,88 assuming unaligned positions. Also, any variation in the axial positioning of the compression elements 86,88 during the compression sequence is automatically accommodated by the free pivotable movement of the compression elements 86,88 within hubs 90,92.

When the spring is fully compressed, an operator clips a bottom portion of the spring 102 to the lower spring seat 110. Any conventional clip 150 may be used for this purpose. Next, the operator removes the nut (not shown) connecting the upper plate 112 to the piston 108. With the nut so removed, the upper plate 112 may be removed. The clip 150 keeps the shock absorber 104 from falling out of spring 102. With the upper plate 112 removed, the operator then turns the handles 80 in the opposite direction and relieves compression on spring 102. With the compression fully relieved, guard 120 is pivoted to its up position and the operator may remove the spring 102 and replace it or repair the shock absorber as desired.

To replace a spring 102 in compression, the apparatus is used in a sequence opposite to that described above. Namely, the spring 102 and clipped on strut 104 are mounted on the attachment members 28,30. The compression head 52 is aligned with compression elements 86,88 engaging the upper portion of the spring 102 and the compression head 52 is urged downwardly to place spring 102 under compression. With the spring 102 under compression, the upper plate 112 is installed and secured to piston 108. Compression is then relieved and the spring is now urging against the lower seat 110 and the upper seat 112.

From the foregoing, it has been shown how the objects of the present invention have been attained in a preferred manner. However, certain modifications of the invention will be apparent to those skilled in the art. For example, the urging means of the present invention has been described as the threaded shaft 74. It is apparent that other urging mechanisms (such as hydraulic or pneumatic actuators) could be utilized having force transmitting ends pivotably connected to linkage 68.

Figure 7:
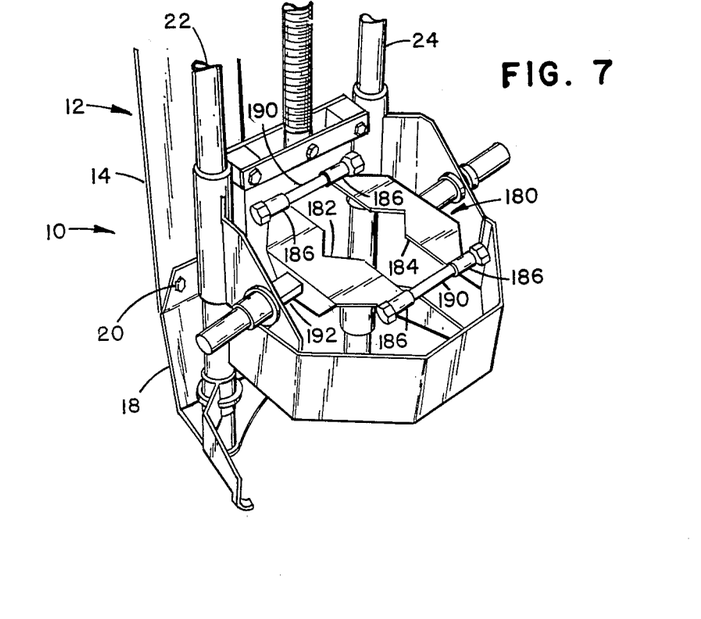
FIG. 7 is a perspective view of the apparatus showing an auxilliary attachment in use with the apparatus.

In FIG. 7, an accessory for use with the present invention is shown generally at 180. The accessory 180 includes a pair of flat planar aligned plates 182,184 which have opposing sleeves 186 slidably mounted on shafts 190. Accordingly, plates 182,184 may be moved toward and away from one another. Each of shafts 182,184 have openings 192 sized to receive the hooked ends 94,96 of the compression elements 86,88. Accessory 180 is particularly useful for undersized MacPherson strut assemblies which may be too small in diameter to be effectively engaged by compression elements 86,88 directly. In such cases, the plates 182,184 are disposed opposing the spring and the compression elements engage the plates 182,184.

From the foregoing it can be seen how the present invention is readily adaptable for use with a wide variety of strut assemblies. The adjustable features of the attachment members 26,28 and 30 permit the apparatus to engage and accurately align a wide variety of shapes and sizes of helical springs 102. Also, the floating head mechanism permits the apparatus to be used on a wide variety of springs with the floating feature of the compression head automatically compensating for irregularities. As a result, when an operator uses the apparatus 10 for various brands of struts, he does not have to adjust the elements 86,88 to accomodate various shapes of different struts. The floating compression head is self-adjusting.

Another indication of the versatility of the present invention is the slidable compression elements 86,88 which may be slid inwardly and outwardly of their hubs 90,92 to engage a spring of many different sizes. Also, the rotary feature of the compression elements 86,88 within their hubs 90,92 also provides for accurate alignment with a wide variety of different springs. Finally, the guard 120 protects an operator, but at the same time is easily removable to permit ready and quick access to a strut assembly. Accordingly, the present invention is readily and quickly adaptable for use with a wide variety of strut assemblies in order to permit an operator to quickly and safely assemble or disassemble a MacPherson-type strut assembly.

From the foregoing detailed description of the present invention, it has been shown how the objects of the invention have been attained in a preferred manner. However, modifications and equivalents of the disclosed concepts, such as readily occur to those skilled in the art, are intended to be included in the scope of this invention. Thus, the scope of the invention is intended to be limited only by the scope of the claims as are, or may hereafter be appended hereto.

I claim:

1. An apparatus for use in assembling and disassembling a strut assembly of the type having a shock absorber (104) axially disposed within a coil spring (102), said apparatus comprising:
   a frame (12);
   a first spring connection means (26,30,38) connected to said frame for holding said spring in a predetermined alignment within said frame and resisting movement of a first portion of said spring in a predetermined compression direction; means for restraining said first spring connector means from movement in said compression direction;
   a compression head (52) mounted on said frame and movable toward and away from said compression direction, said compression head including first and second compression elements (86,88) for imparting a force on a second portion of said spring and urging said spring to compress as said compression head is moved toward said compression direction, said compression head including a first compression member and a second compression member, means for mounting said compression members to said frame with said members movable in linear spaced apart paths toward and away from said compression direction, said first compression element connected to said first compression member and said second compression element connected to said second compression member;

urging means (74) for urging said compression head to move toward said compression direction;

said compression head including connector means (68) for connecting said first and second compression elements such that said first and second compression elements movable relative to one another and free to assume unaligned positions as said compression head urges said spring into compression, said connector means including a linkage pivotably connecting said first and second members and accommodating relative movement of said members in spaced apart parallel paths; and a force transmitting end on said urging means, said force transmitting end being pivotably connected to said linkage.

2. An apparatus according to claim 1 wherein said first connector means includes a plurality of attachment members (26,30,38) secured to said frame, said attachment members having attachment ends (36,38,39) contoured to engage said spring, said attachment members movable between a plurality of releasable fixed positions along said frame whereby an operator can move said attachment members to align said attachment ends with a first portion of said spring (102).

3. An apparatus according to claim 2 wherein said plurality of attachment members include one attachment member (26,28) movable toward and away from the compression direction with means for locking said one member in a desired location.

4. An apparatus according to claim 3 wherein said one attachment member is pivotable about an axis parallel to said direction of movement.

5. An apparatus according to claim 2 wherein said plurality of said attachment members includes a second attachment member (30) slidable toward and away from an axis of a spring aligned within said apparatus.

6. An apparatus for use in assembling and disassembling a strut assembly of the type having a shock absorber axially disposed within a coil spring, said apparatus comprising:

a frame;

a pair of spaced apart parallel bars secured to said frame and stationary relative to said frame;

a first compression member secured to a first of said bars for movement along said first bar in a linear path, a second compression member connected to a second of said bars for movement along said second bar in a linear path parallel to said path of movement of said first compression member; first and second compression elements respectively connected to said first and second compression members linkage connecting said first compression member to said second compression member with said linkage accommodating relative movement of said first compression member and said second compression member;

urging means pivotably connected to said linkage for urging said linkage to move in a compression direction;

a first spring connector means connected to said frame for holding said spring in predetermined alignment within said frame and resisting movement of a first portion of said spring in the compression direction; means for restraining said first spring connector means from movement in the compression direction;

said first spring connector means and said first and second compression members disposed for said spring to be received between said first spring connector means and said first and second compression members with said first and second compression members disposed opposing a second portion of said spring and urging said spring into compression as said compression members move in the compression direction.

7. An apparatus according to claim 6 wherein said compression elements are slidably received within said compression members such that said slidable elements are disposed opposing a second portion of said spring.

8. An apparatus according to claim 6 comprising a guard member secured to said apparatus and pivotable to a down position with a protective plate of said guard surrounding a spring aligned within said apparatus, said guard member further pivotable to an up position wherein said aligned spring is accessible to an operator of said apparatus.

9. An apparatus according to claim 6 wherein said connector means includes a plurality of attachment members secured to said frame, said attachment members having attachment ends selected to engage said spring, said attachment members movable between a plurality of releasable fixed positions whereby an operator can move said attachment members to align said attachment ends with a first portion of said spring.

10. An apparatus according to claim 6 wherein said linkage includes a rigid connecting element (70,72) having first end pivotally connected to said first connection member and a second end pivotally connected to said second connection member.

* * * * *